March 24, 1925.                                                          1,530,593
C. H. CALKINS
APPARATUS FOR COUNTERSINKING
Filed April 25, 1922      2 Sheets-Sheet 1
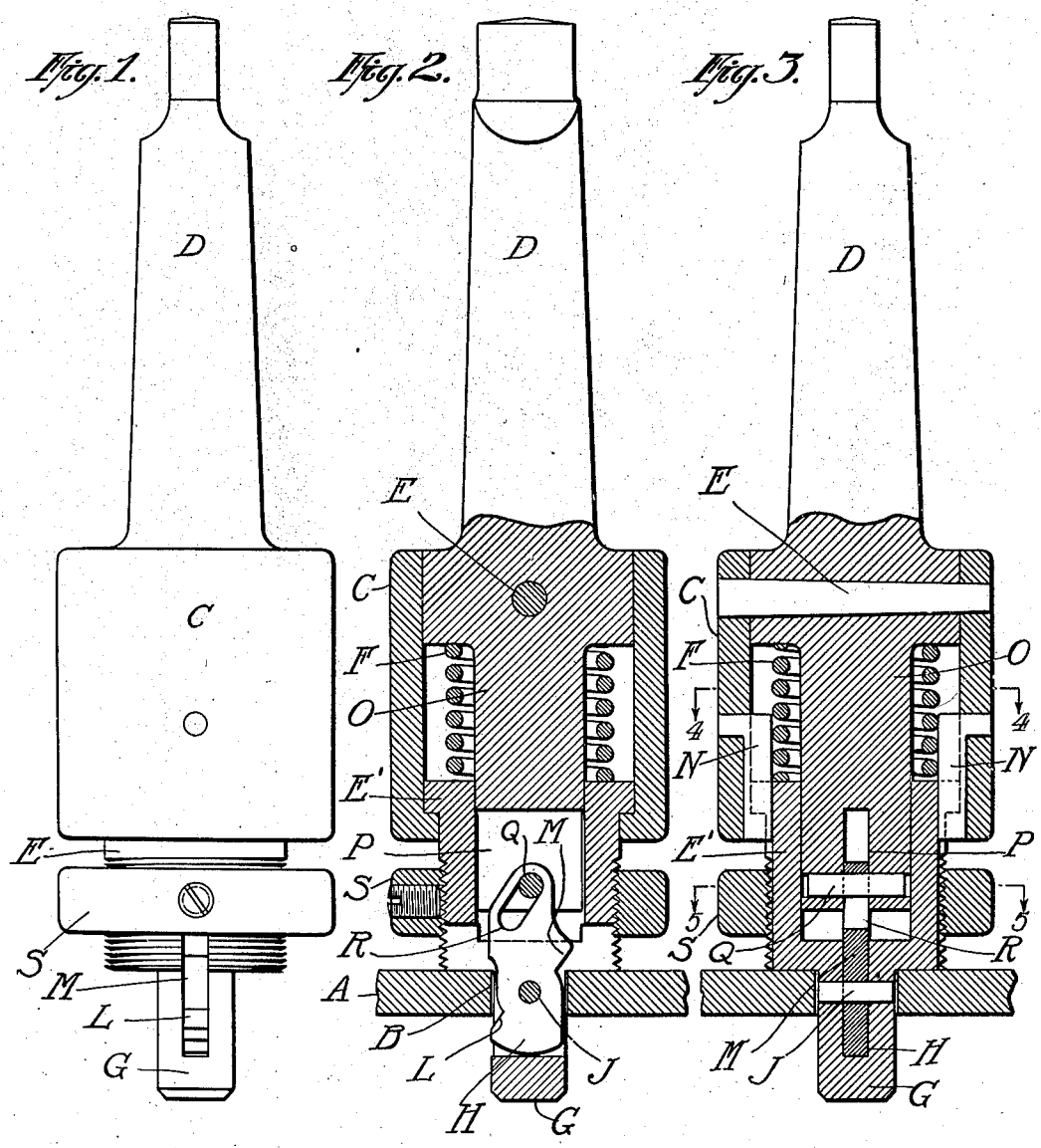
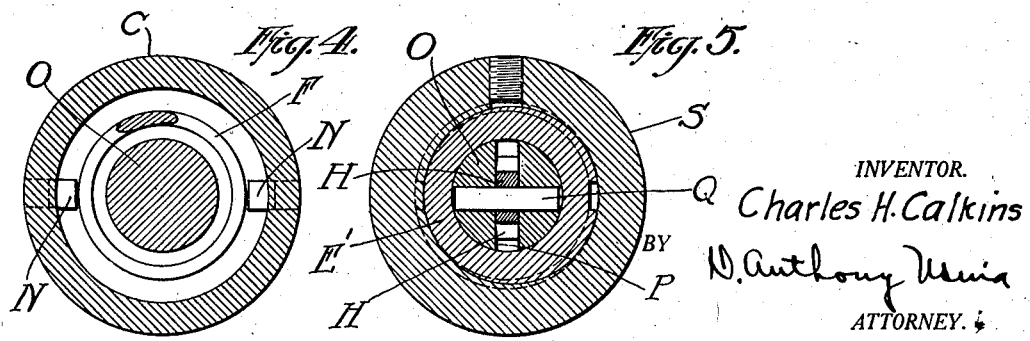
INVENTOR.
Charles H. Calkins
BY
ATTORNEY.

March 24, 1925.

C. H. CALKINS

APPARATUS FOR COUNTERSINKING

Filed April 25, 1922    2 Sheets-Sheet 2

1,530,593

INVENTOR.

Charles H. Calkins

BY

ATTORNEY.

Patented Mar. 24, 1925.

1,530,593

UNITED STATES PATENT OFFICE.

CHARLES H. CALKINS, OF LUDLOW, MASSACHUSETTS, ASSIGNOR TO BAUSH MACHINE TOOL COMPANY, A CORPORATION OF MASSACHUSETTS.

APPARATUS FOR COUNTERSINKING.

Application filed April 25, 1922. Serial No. 556,494.

*To all whom it may concern:*

Be it known that I, CHARLES H. CALKINS, a citizen of the United States, and resident of Ludlow, Massachusetts, have invented certain new and useful Improvements in Apparatus for Countersinking, of which the following is a specification.

My invention aims to provide an improved apparatus for countersinking, counterboring, reaming and similar operations by means of which a hole may be countersunk expeditiously on both its forward and its rear edges.

The accompanying drawings illustrate embodiments of the invention.

Fig. 1 is a side elevaton of a spindle or holder equipped with my improvement;

Figs. 2 and 3 are longitudinal sections of the same taken on planes at right angles to each other;

Figs. 4 and 5 are transverse sections on the correspondingly numbered lines of Fig. 3;

Figure 6:
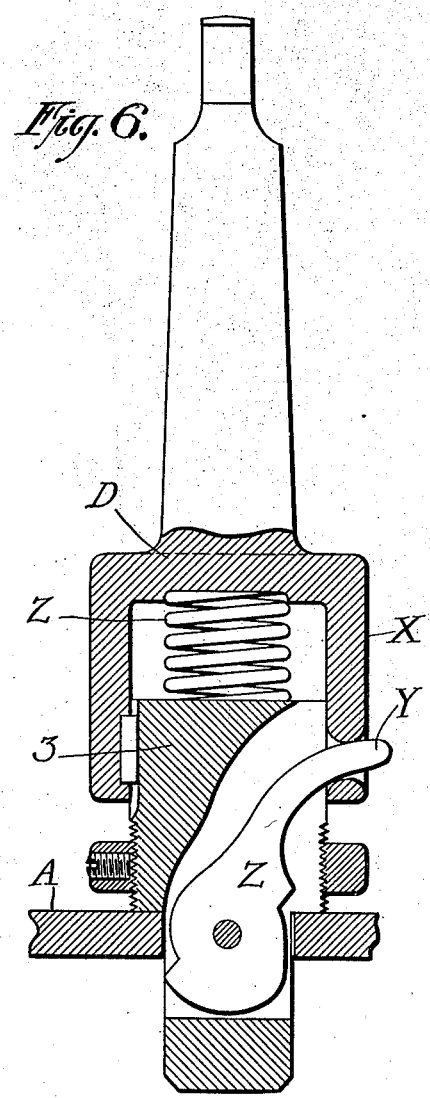
Fig. 6 is a section similar to Fig. 2 illustrating an alternative form.

The purpose of the apparatus is to countersink or ream the forward and the rear edge of a hole by a single stroke of the spindle or holder which carries the countersinking tool; the two countersinking operations being performed either simultaneously or in succession during the advance and return of the spindle. A single spindle and holder equipped with a double-countersinking tool is illustrated, but the invention may be equally well applied to a number of spindles in a multiple spindle drilling machine. The invention can be applied for countersinking or reaming to a considerable depth or for simply burring the hole, that is removing the ragged edges which occur after drilling, and especially with steel.

Referring first to Figs. 1 to 5, the work is a plate A which has been drilled to form a hole B which has to be countersunk on both edges. The holder for the countersinking tool comprises a sleeve C with a shank D entering the upper end thereof and fastened thereto by means of a tapered pin E.

The lower end of the sleeve C is flanged and apertured to receive a carrier E' which has a flange at its upper end resting in the bottom of the sleeve C and pressed down by a spiral spring F within the sleeve. The lower end of the carrier E' is in the form of a stem G adapted to pass through the hole to be countersunk, and this stem and the lower part of the head of the carrier E' are provided with a vertical slot in which lies a cutter H pivoted at J and having a pair of cutting edges L and M respectively. The width of the tool in the position of Fig. 2 is such as to pass freely into the hole in the work. But by tilting the tool about its pivot the two cutting edges L and M will be brought into engagement with the edges of the plate so as to ream the latter by the rotation of the spindle.

The sleeve C is provided with keys N, Figs. 3 and 4, adapted to slide in grooves in the flange of the carrier E' so as to rotate the latter while permitting it to move up in the sleeve.

The shank has a downward extension O entering the tool carrier E' and formed at its lower end with a vertical slot P in which the upper end of the cutting tool is located. The member O carries also a transverse pin Q passing through an oblique slot R in the end of the tool.

Now, when the spindle is advanced to the work, the stem G passes through the hole until the shoulder portion of the carrier E' strikes the work. Thereafter the tool and carrier can advance no further. The continued advance of the spindle presses the pin Q down in the slot R and thus tilts the tool and brings its cutting edges into engagement with the edges of the hole, gradually forcing the cutting edges out as the advance continues. When the work is done and the spindle is retracted, the spring F holds down the tool carrier and causes the return of the cutter to its starting position so as to permit the withdrawal of it and the stem G.

In order that the countersinking may not be too deep, I preferably provide an adjusting nut S which is threaded on the tool carrier and fastened by a set screw. This limits the downward movement of the spindle and the sleeve C with respect to the carrier.

Fig. 6 illustrates a variant in which the spindle D is made in one piece with a sleeve X provided with an opening through which extends the tail Y of a pivoted cutter Z. A spring 2 holds down the carriage 3 in which the cutter is mounted. As the carrier is pressed upward by engagement with the face of the work the top of the tail Y bearing against the upper wall of the hole in the sleeve X forces the edges of the cutter out to operative positions; on the return movement, the spring Z presses down the carrier 3 and its cutter, restoring the latter to its starting position; or the engagement of the work with the lower edge of the cutter may be depended on for this purpose.

Though I have described with great detail certain specific embodiments of my invention, yet it is not to be understood therefrom that the invention is restricted to the particular embodiments disclosed. Various modifications in detail and in the arrangement of the parts may be made by those skilled in the art without departure from the invention as defined in the following claim.

What I claim is:

A countersinking apparatus comprising a holder with a shank by means of which it is advanced and rotated, a carrier longitudinally movable with respect to said holder, a spring pressing said carrier forward, said carrier having a stem entering the hole in the work when the carrier bears against the face of the work and a cutter carried by the stem and having opposite cutting edges and means actuated by a further forward movement of the holder for forcing said cutting edges against the opposite faces of the work.

In witness whereof, I have hereunto signed my name.

CHARLES H. CALKINS.